United States Patent
Nishio et al.

(10) Patent No.: US 6,863,355 B2
(45) Date of Patent: Mar. 8, 2005

(54) BRAKE CONTROL DEVICE FOR A VEHICLE

(75) Inventors: Akitaka Nishio, Anjo (JP); Shiro Monzaki, Mishima (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 112 days.

(21) Appl. No.: 10/325,732

(22) Filed: Dec. 23, 2002

(65) Prior Publication Data

US 2003/0117013 A1 Jun. 26, 2003

(30) Foreign Application Priority Data

Dec. 25, 2001 (JP) ........................................ 2001-390803

(51) Int. Cl.[7] ............................................... B60T 8/24
(52) U.S. Cl. .................... 303/140; 303/113.3; 303/155; 303/177
(58) Field of Search ........................... 303/113.2, 113.3, 303/114.1, 114.3, 116.1, 139, 140, 155, 177, 183

(56) References Cited

U.S. PATENT DOCUMENTS

| | | | |
|---|---|---|---|
| 5,372,409 A | | 12/1994 | Farr |
| 6,164,735 A | * | 12/2000 | Aizawa et al. ............... 303/155 |
| 6,179,396 B1 | * | 1/2001 | Fukami et al. .............. 303/155 |
| 6,463,378 B2 | * | 10/2002 | Nishio ......................... 303/155 |
| 6,672,687 B2 | * | 1/2004 | Nishio ...................... 303/113.4 |

FOREIGN PATENT DOCUMENTS

JP  2924913 B3  5/1999

* cited by examiner

*Primary Examiner*—Thomas Williams
(74) *Attorney, Agent, or Firm*—Burns, Doane, Swecker & Mathis, L.L.P.

(57) ABSTRACT

A brake control device for a vehicle controls a vehicle wheel by supplying a hydraulic pressure generated by a hydraulic pressure generating device to a wheel brake cylinder of the vehicle wheel when a brake operating member is not being operated. When the brake operating member is operated while the hydraulic pressure has been supplied to the wheel brake cylinder for the vehicle wheel, a hydraulic pressure control valve device for the other vehicle wheel is controlled for supplying the hydraulic pressure to a wheel brake cylinder for the other vehicle wheel. Therefore, the hydraulic pressure is supplied to the wheel brake cylinder for the other vehicle wheel as well.

13 Claims, 10 Drawing Sheets

BRAKE CONTROL DEVICE FOR A VEHICLE

CROSS REFERENCE TO RELATED APPLICATIONS

This application is based on and claims priority under 35 U.S.C. § 119 with respect to a Japanese Patent Application 2001-390803, filed on Dec. 25, 2001, the entire content of which is incorporated herein by reference.

FIELD OF THE INVENTION

This invention generally relates to a brake control device for a vehicle. More particularly, this invention pertains to a vehicle brake control device having a hydraulic pressure generating device capable of generating a hydraulic pressure irrespectively of operation of a brake pedal. The hydraulic pressure generated by the hydraulic pressure generating device is supplied to a wheel brake cylinder via a hydraulic control valve device. The brake control device is applicable especially for use in a steering control device (a vehicle side slip preventing control device) or a traction control device.

BACKGROUND OF THE INVENTION

A known brake control apparatus for a vehicle is disclosed in a U.S. Pat. application Ser. No. 5,372,409 which corresponds to a Japanese Patent Laid-open Application No. 2(1990)-241863. This known brake control apparatus includes a tandem hydraulic master cylinder capable of generating a master cylinder hydraulic pressure to be supplied to a wheel brake cylinder, a vacuum-suspended booster for activating the master cylinder, and an electromagnetic valve means for activating the booster. When a driving wheel is idly spinning, the master cylinder hydraulic pressure is generated in response to an automatic operation of the booster by the electromagnetic valve means. The master cylinder hydraulic pressure is supplied to the driving wheel (i.e. a controlled wheel) spinning irrespectively of operation of a brake pedal, wherein braking force can be applied to the controlled wheel. In this case, a traction control can be executed. While the traction control has been executed, a non-controlled wheel, which is not driven, has been disconnected from the master cylinder via an anti-lock modulator assembly.

As described above, while the traction control has been executed, the non-controlled wheel has been always disconnected from the master cylinder. Therefore, when the brake pedal is depressed by a driver under the traction control, a vehicle deceleration can not be generated corresponding to the brake pedal depression. Further, when the above-described brake control apparatus is applied for use in other hydraulic pressure control devices including a steering control device, and so on, the same problem may occur.

The present invention therefore seeks to provide an improved brake control apparatus capable of generating a vehicle deceleration corresponding to a brake pedal operational amount and of improving a brake pedal operating feeling applied to a driver when the brake pedal is operated while a hydraulic pressure control has been applied to a controlled wheel.

SUMMARY OF THE INVENTION

A brake control device for a vehicle includes a first wheel brake cylinder equipped to a first vehicle wheel for applying a braking force to the first vehicle wheel, a second wheel brake cylinder equipped to a second vehicle wheel for applying a braking force to the second vehicle wheel, a hydraulic pressure generating device for generating a hydraulic pressure irrespectively of operation of a brake operating member, a hydraulic pressure control valve device disposed between the hydraulic pressure generating device and the first and second wheel brake cylinders for controlling the brake hydraulic pressure in the respective first and second wheel brake cylinders, a hydraulic pressure controlling means for controlling the hydraulic pressure control valve device for one of the first and second wheel brake cylinders equipped to one of the first and second vehicle wheels to be controlled in response to a vehicle driving condition for supplying the hydraulic pressure from the hydraulic pressure generating device to the one wheel brake cylinder for the one vehicle wheel to be controlled at least when the brake operating member is not being operated, a brake amount detecting means for detecting an operational amount of the brake operating member, a vehicle deceleration detecting means for detecting or estimating a vehicle deceleration, a wheel brake cylinder hydraulic pressure detecting means for detecting or estimating the brake hydraulic pressure in the respective first and second wheel brake cylinders, and a non-controlled vehicle wheel controlling means for controlling the hydraulic pressure control valve device for the other one of the first and second vehicle wheels which is not controlled by the hydraulic pressure controlling means so as to control the brake hydraulic pressure in the other wheel brake cylinder equipped to the other vehicle wheel which is not controlled by the hydraulic pressure controlling means in response to the operational amount of the brake operating member when the brake operating member is operated while the hydraulic pressure has been supplied to the one wheel brake cylinder by the hydraulic pressure controlling means.

The non-controlled vehicle wheel controlling means include a target vehicle deceleration calculating means for calculating a target vehicle deceleration based upon the brake operating member operational amount detected by the brake amount detecting means, a target wheel brake cylinder hydraulic pressure calculating means for calculating a target wheel brake cylinder hydraulic pressure for the other wheel brake cylinder based upon the brake operating member operational amount detected by the brake amount detecting means, a deceleration deviation calculating means for calculating a deceleration deviation between the target vehicle deceleration calculated by the target vehicle deceleration calculating means and the vehicle deceleration detected or estimated by the vehicle deceleration detecting means, a hydraulic pressure deviation calculating means for calculating a hydraulic pressure deviation between the target wheel brake cylinder hydraulic pressure for the other wheel brake cylinder calculated by the target wheel brake cylinder hydraulic pressure calculating means and the brake hydraulic pressure in the other wheel brake cylinder detected or estimated by the wheel brake cylinder hydraulic pressure detecting means, and a valve controlling means for controlling the hydraulic pressure control valve device for the other vehicle wheel which is not controlled by the hydraulic pressure controlling means so as to decrease a larger deviation in response to a deviated amount of the larger deviation of either the deceleration deviation calculated by the deceleration deviation calculating means or the hydraulic pressure deviation calculated by the hydraulic pressure deviation calculating means.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Figure 1:
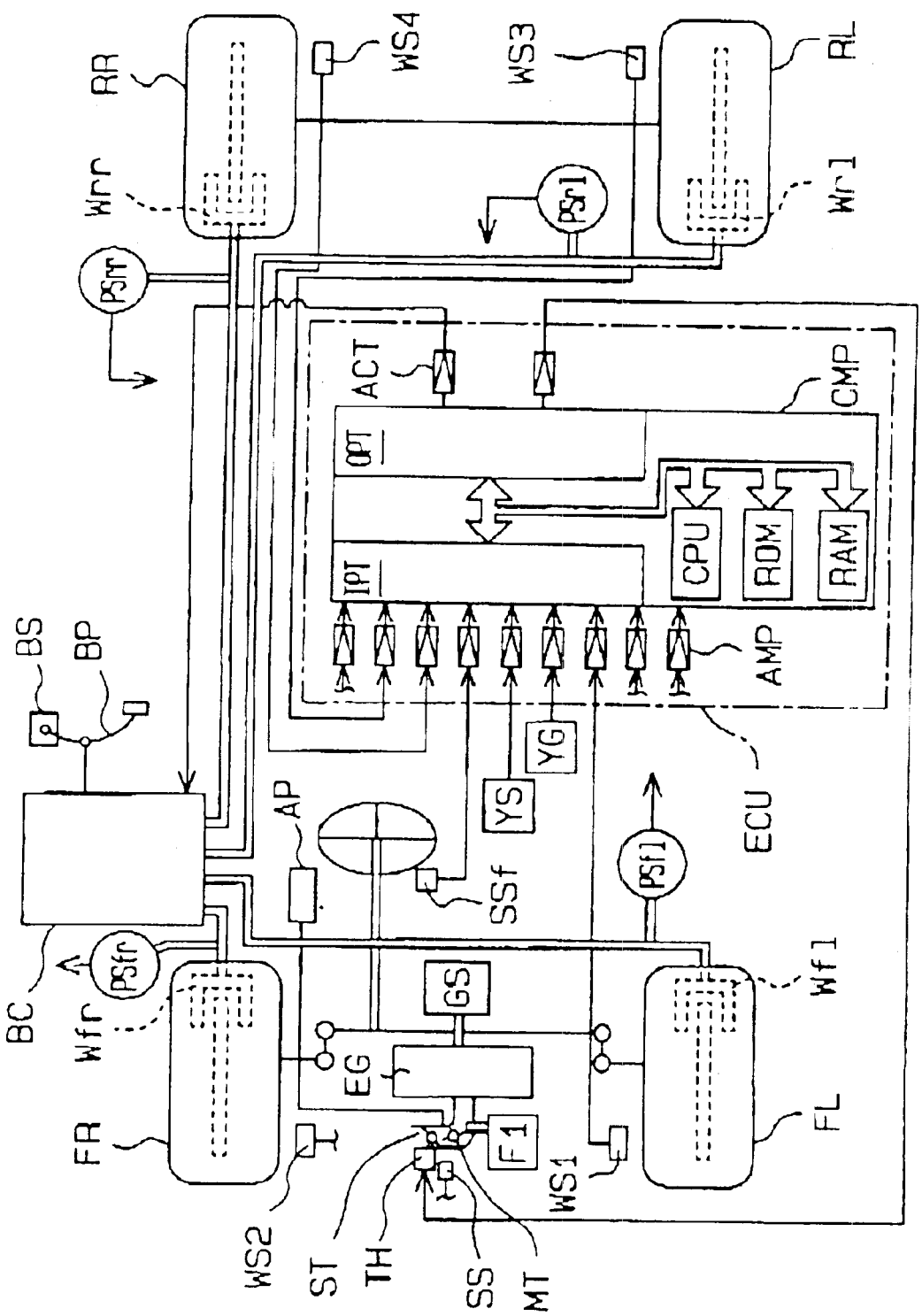
FIG. 1 is a schematic view illustrating a brake control device for a vehicle according to an embodiment of the present invention.

Referring initially to FIG. 1, a brake control apparatus for a vehicle according to an embodiment of the present invention includes an engine EG (an internal combustion engine) provided with a throttle control device TH and a fuel injection device FI, and an electronic control unit ECU (hereinafter, referred to as an ECU). The throttle control device TH is equipped with a main throttle valve MT and a sub throttle valve ST. An opening degree of the main throttle valve MT is controlled by the throttle control device TH in response to an operation of an accelerator pedal AP. The sub throttle valve ST is activated in response to an output from the ECU so that an opening degree of the sub throttle valve ST can be controlled. The fuel injection device FI is also activated in response to the output from the ECU so that a fuel oil consumption can be controlled. The engine EG is operatively connected to vehicle front wheels FL and FR via a transmission control device GS and a not-illustrated differential gear so that the vehicle is driven by a front-wheel-drive system.

Figure 2:
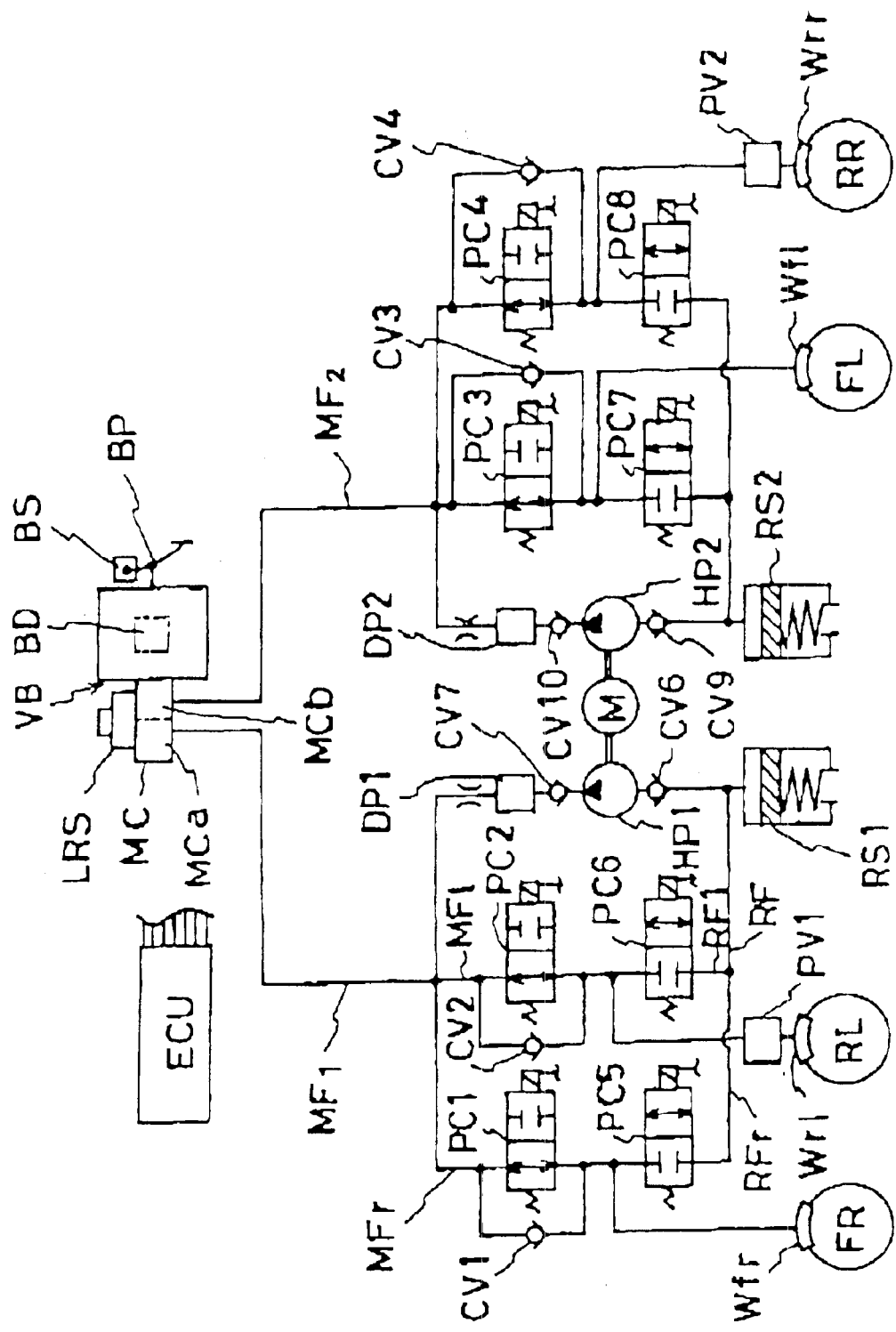
FIG. 2 is a block view illustrating a brake hydraulic pressure control device illustrated in FIG. 1.

The vehicle is provided with the front wheels FL and FR (first and second vehicle wheels), which are equipped with wheel brake cylinders Wfl and Wfr respectively, and rear wheels RL and RR (the first and second vehicle wheels), which are equipped with wheel brake cylinders Wrl and Wrr respectively. A brake hydraulic pressure control device BC is connected to each wheel brake cylinder Wfl, Wfr, Wrl, and Wrr (first and second wheel brake cylinder). More particularly, the front wheel FL designates a drive wheel at the front-left hand side as viewed from the position of a driver's seat, the front wheel FR designates a drive wheel at the front-right hand side as viewed therefrom, the rear wheel RL designates a wheel, which is not driven, at the rear-left hand side as viewed therefrom, and the rear wheel RR designates a wheel, which is not driven, at the rear-right hand side as viewed therefrom. A structure of the brake hydraulic pressure control device BC is schematically illustrated in FIG. 2 and will be described in more detail later.

The wheels FL, FR, RL, and RR are provided with respective wheel speed sensors WS1, WS2, WS3, and WS4. Each wheel speed sensor WS1, WS2, WS3, and WS4 is connected to the ECU so as to output a signal in the form of pulses proportional to a rotational speed of each wheel, i.e. a wheel speed signal of each wheel to the ECU. Further, other sensors are connected to the ECU, including a stroke sensor BS (a brake amount detecting means) for detecting a stroke of a brake pedal (a brake operating member) BP, a front wheel steering angle sensor SSf for detecting a steering angle θf of each front wheel FL and FR, a lateral acceleration sensor YG for detecting a vehicle lateral acceleration Gy, a yaw rate sensor YS for detecting a vehicle yaw rate γ, a throttle sensor SS for detecting the opening degree of each throttle valve MT and ST, pressure sensors PSfl, PSfr, PSrl, and PSrr (a wheel brake cylinder hydraulic pressure detecting means) for detecting wheel brake cylinder hydraulic pressure Pw** of the respective wheel brake cylinders Wfl, Wfr, Wrl, and Wrr. The yaw rate sensor YS is employed for detecting a change speed of a vehicle rotation angle (i.e. a yaw angle) around a vertical axis on the vehicle center of gravity, i.e. for detecting a yaw angular velocity (i.e. the yaw rate γ). The yaw angular velocity is outputted to the ECU as the yaw rate γ.

Although, the vehicle brake control device according to the embodiment of the present invention is provided with the pressure sensors for detecting the wheel brake cylinder hydraulic pressure Pw of the respective wheel brake cylinders, the wheel brake cylinder hydraulic pressure Pw can be estimated by the ECU not by use of the pressure sensors, but based upon information from the various sensors. The vehicle brake control device according to the embodiment of the present invention can further include a steering angle control device (not shown) disposed between the vehicle rear wheels RL and RR. In this case, the steering angle of each rear wheel RL and RR can be controlled by a motor (not shown) in accordance with the output from the ECU.

Figure 3:
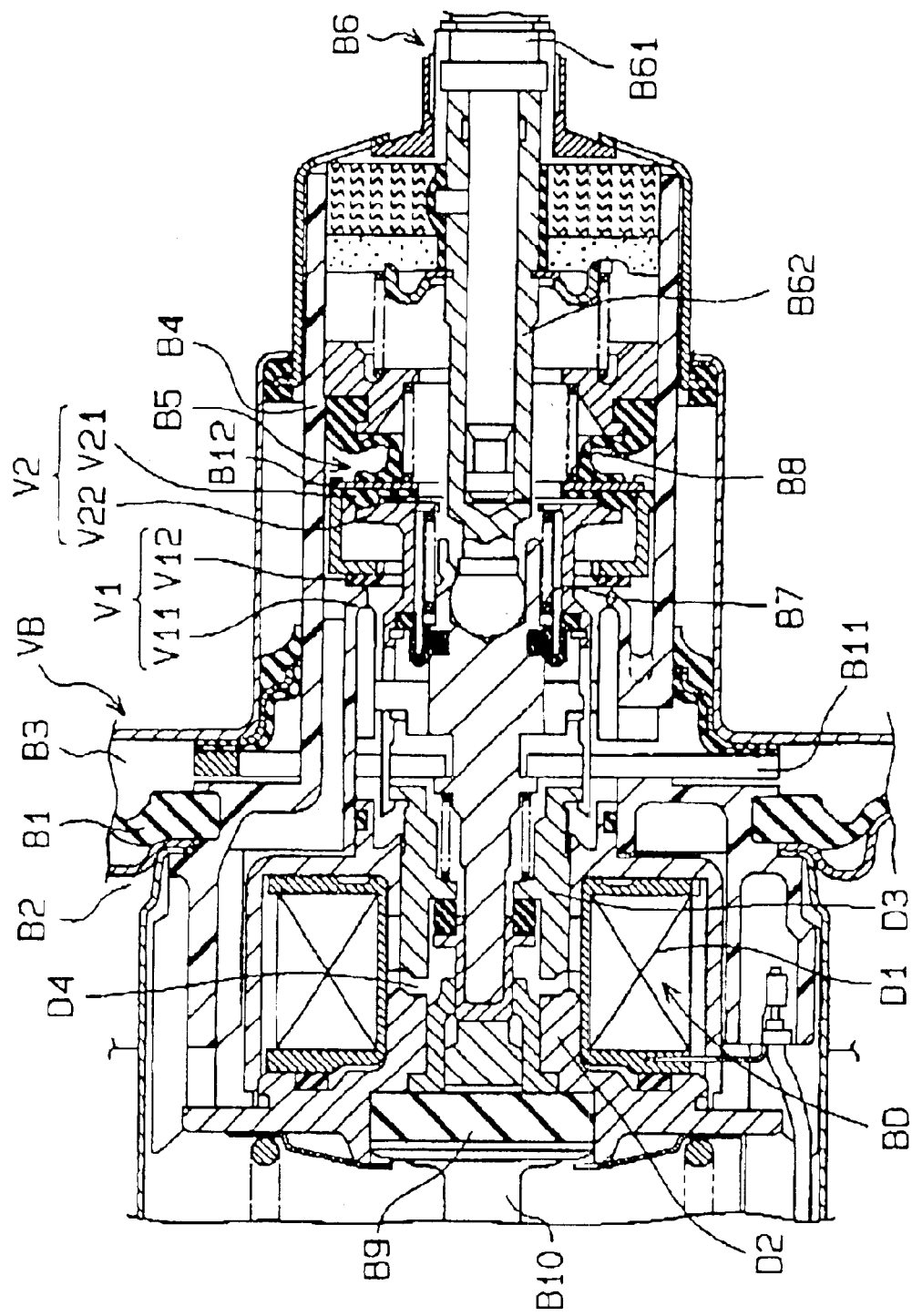
FIG. 3 is a cross-sectional view illustrating a vacuum booster and a booster driving device illustrated in FIG. 2.

The ECU is provided with a microcomputer (CMP) which includes a central processing unit (CPU), a read only memory (ROM), a random access memory (RAM), an input port (IPT), and an output port (OPT), all which are connected through a bus one another as illustrated in FIG. 1. The output signals from the wheel speed sensors WS1, WS2, WS3, and WS4, the stroke sensor BS, the front wheel steering angle sensor SSf, the yaw rate sensor YS, the lateral acceleration sensor YG, the throttle sensor SS, and so on are transmitted to the input port IPT via respective amplification circuits AMP and then to the CPU. The output signals are transmitted from the output port RPT to the throttle control device TH and the brake hydraulic pressure control device BC via respective driving circuits ACT. A program corresponding to various processes including a process shown by a flow chart illustrated in FIG. 3 is memorized in the ROM included in the microcomputer CMP. The program is performed by the CPU when an ignition switch (not shown) is turned on. The RAM temporarily memorizes variable data requisite for performing the program. As an alternative to the arrangement described above, a plurality of microcomputers can be provided corresponding to respective controls such as the throttle control or corresponding to controls relevant to each other. In this case, the microcomputers can be electrically connected to each other.

Referring to FIG. 2, according to the brake hydraulic pressure control device BC of the embodiment of the present invention, a master cylinder MC is boosted and activated via a vacuum booster VB in response to the operation of the brake pedal BP. The hydraulic brake pressure in a master reservoir LRS is then pressurized and a master cylinder hydraulic pressure is outputted to a brake hydraulic circuit system for the wheels FR and RL and to the other brake hydraulic circuit system for the wheels FL and RR. That is, a so-called diagonal hydraulic circuit system is formed. The master cylinder MC is a tandem type master cylinder having a first pressure chamber MCa and a second pressure chamber MCb which communicate with the brake hydraulic circuit system, respectively. The first pressure chamber MCa communicates with the brake hydraulic circuit system for the wheels FR and RL and the second pressure chamber MCb communicates with the other brake hydraulic circuit system for the wheels FL and RR.

The first pressure chamber MCa is connected to the wheel brake cylinders Wfr and Wrl via a main hydraulic passage MF1 and its branch hydraulic passages MFr and MFl. The second pressure chamber MCb is connected to the wheel brake cylinders Wfl and Wrr via a main hydraulic passage MF2.

Normally open type two-port two-position electromagnetic valves PC1 and PC2 (hereinafter, referred to as electromagnetic valves PC1 and PC2) are disposed in the branch hydraulic passages MFr and MFl, respectively. Check valves CV1 and CV2 are arranged in parallel to the electromagnetic valves PC1 and PC2, respectively. The check valves CV1 and CV2 allow a brake fluid flow in a direction of the master cylinder MC while preventing the brake fluid flow in a reverse direction. Therefore, the brake fluid in the wheel brake cylinders Wfr and Wrl are returned to the master cylinder MC and the master reservoir LRS via the check valves CV1 and CV2 and the electromagnetic valves PC1 and PC2. According to the aforementioned structure of the brake hydraulic circuit system, the brake hydraulic pressure in each wheel cylinder Wfr ane Wrl rapidly decreases corresponding to a decrease of the master cylinder hydraulic pressure when the brake pedal BP is released from a depressed condition.

Normally closed type two-port two-position electromagnetic valves PC5 and PC6 (hereinafter, referred to as electromagnetic valves PC5 and PC6) are disposed in branch hydraulic passages RFr and RFl for discharging the brake fluid in the wheel brake cylinders Wfr and Wrl, respectively. The branch hydraulic passages RFr and RFl are merged into a drain hydraulic passage RF which is connected to an auxiliary reservoir RS1. The auxiliary reservoir RS1 communicates with an inlet side of a hydraulic pressure pump HP1 via a check valve CV6. An outlet side of the hydraulic pressure pump HP1 communicates with an upstream of the electromagnetic valves PC1 and PC2 via a check valve CV7. The hydraulic pressure pump HP1 is driven by a signal electric motor M along with a hydraulic pressure pump HP2 disposed in the other brake hydraulic circuit system, and returns the brake fluid in the auxiliary reservoir RS1 to the outlet side thereof. The auxiliary reservoir RS1 is disposed independently of the master reservoir LRS of the master cylinder MC and is provided with a piston and a spring. Therefore, the auxiliary reservoir RS1 can serve as an accumulator capable of accumulating a predetermined amount of the brake fluid. The check valves C6 and C7 are respectively an input valve and an output valve for limiting the flow of the brake fluid discharged via the hydraulic pressure pump HP1 in a specific direction, and are normally formed within the hydraulic pressure pump HP1 as a single unit.

A damper DP1 is disposed at the outlet side of the hydraulic pressure pump HP1. Further, a proportioning valve PV1 is disposed in a hydraulic passage communicating with the wheel brake cylinder Wrl.

The brake hydraulic circuit system for the wheels FL and RR are provided with various valves and so on in the same manner as the brake hydraulic circuit system for the wheels FR and RL. More particularly, the brake hydraulic circuit system for the wheels FL and RR are provided with normally open type electromagnetic valves PC3 and PC4 (hereinafter, referred to as electromagnetic valves PC3 and PC4), normally closed type electromagnetic valves PC7 and PC8 (hereinafter, referred to as electromagnetic valves PC7 and PC8), check valves CV3, CV4, CV9, and CV10, an auxiliary reservoir RS2, a damper DP2, and a proportioning valve PV2. The hydraulic pressure pump HP2 is driven by the electric motor M along with the hydraulic pressure pump HP1. Each above-described electromagnetic valve PC1 through PC8 serves as a hydraulic pressure control valve device of the present invention for controlling the brake hydraulic pressure in each wheel brake cylinder.

A booster driving device BD is accommodated in the vacuum booster VB for automatically activating the vacuum booster VB at least when the brake pedal BP is not being operated. Referring to FIG. 3, the vacuum booster VB according to the embodiment of the present invention is formed in a manner similar to a known vacuum booster. A constant pressure chamber B2 and a variable pressure chamber B3 are formed inside a housing by a movable wall B1 which is integrally connected to a power piston B4. The constant pressure chamber B2 always communicates with a negative pressure source such as an intake manifold (not shown) of the engine EG so that a negative pressure is introduced in the constant pressure chamber B2. The power piston B4 is connected to an output rod B10 via a reaction disc B9 for executing a force transmitting. The output rod B10 is connected to the master cylinder MC.

A vacuum valve V1 and an air valve V2 are disposed inside of the power piston B4 and serve as a valve mechanism B5. The vacuum valve V1 includes an annular valve seat V11 integrally formed with the power piston B4 and an elastic valve member V12 which is engageable with and disengageable from the annular valve seat V11. The vacuum valve V1 interrupts communication between the constant pressure chamber B2 and the variable pressure chamber B3. The air valve V2 includes an elastic valve seat V21 fixed to a retainer B12 and a valve member V22 which is engageable with and disengageable from the elastic valve seat V21. The air valve V2 interrupts communication between the variable pressure chamber B3 and an atmosphere. The valve member V22 is operatively connected to an input rod B6 operated in response to the operation of the brake pedal BP and is biased by a valve spring S7 in a direction for being engaged with the elastic valve seat V21. The elastic valve member V12 of the vacuum valve V1 is biased by a spring B8 in a direction for being engaged with the annular valve seat V11. Further, the elastic valve seat V21 of the air valve V2 is biased in a direction for being engaged with the valve member V22.

Accordingly, the vacuum valve V1 and the air valve V2 of the valve mechanism B5 are opened or closed in response to the operation of the brake pedal BP. A pressure differential between the constant pressure chamber B2 and the variable pressure chamber B3 is hence generated corresponding to the depression of the brake pedal BP. Therefore, an output force pressurized corresponding to the depression of the brake pedal BP can be transmitted to the master cylinder MC.

The booster driving device BD includes a solenoid D1, a fixed core D2, and a movable core D3. The solenoid D1 is electrically connected to the ECU as shown in FIG. 2 and attracts the movable core D3 in a direction of the fixed core D2 when being excited. The fixed core D2 is disposed between the power piston B4 and the reaction disc B9 so as to transmit the force from the power piston B4 and to the reaction disc B9. The movable core D3 is arranged in the solenoid D1 to face the fixed core D2, wherein a magnetic gap D4 is defined between the movable core D3 and the fixed core D2. The movable core D3 is engaged with the valve member V22 of the air valve V2. When the movable core D3 is moved relative to the fixed core D2 in a direction for decreasing the magnetic gap D4, the valve member V22 of the air valve V2 can be moved along with the movable core D3 as a unit.

The input rod B6 includes a first input rod (a first input member) B61 and a second input rod (a second input member) B62. The first input rod B61 is integrally connected to the brake pedal BP and the second input rod B62 is movable relative to the first input rod B61. The second input rod B62 further serves as a force transmitting member towards the output rod B10 via a key member B11 corresponding to the movement of the power piston B4. The first input rod B61 and the second input rod B62 forms a so-called brake operating member holding mechanism of the present invention for holding the brake pedal BP at an initial position in the case that the vacuum booster VB has been activated when the brake pedal BP has not been depressed.

Set forth below is a description of the operation of the booster driving device BD, the vacuum booster VB, and the brake operating member holding mechanism B6 when performing a hydraulic pressure control (such as steering control or traction control) capable of automatically pressurizing the wheel brake cylinder for a wheel to be controlled at least when the brake pedal BP is not being operated.

When the hydraulic pressure control is commenced by the ECU, the solenoid D1 is excited and the movable core D3 is moved in the direction for decreasing the magnetic gap D4. The valve member V22 of the air valve V2 is moved integrally with the movable core D3 against a biasing force of the valve spring B7. The elastic valve member V12 of the vacuum valve V1 is biased by the spring B8 and is engaged with the annular valve seat V11. Therefore, the communication between the variable pressure chamber B3 and the constant pressure chamber B2 is interrupted in response to the closing operation of the vacuum valve V1. The valve member V22 of the air valve V2 is further moved in a vehicle forward direction so that the valve member V22 is separated from the elastic valve seat V21. Therefore, an atmospheric air is introduced to the variable pressure chamber B3. The pressure differential between the constant pressure chamber B2 and the variable pressure chamber B3 is hence generated. Accordingly, corresponding to the movement of the power piston B4, the fixed core D2, the reaction disc B9, and the output rod B10 in a direction of the master cylinder MC, the master cylinder hydraulic pressure can be automatically generated by the master cylinder MC.

The second input rod B62 engaged with the key member B11 is moved in the vehicle forward direction integrally with the power piston B4 being engaged with the key member B11. The first input rod B61 is not applied with the forward moving force of the power piston B4 so as to be held at the initial position. That is, the brake pedal BP is held at the initial position while the vacuum booster VB has been automatically activated by the booster driving device BD.

As described above, the vacuum booster VB, the booster driving device BD, and the master cylinder MC form a hydraulic pressure generating device of the present invention.

The steering control (oversteer restraining control/understeer restraining control) can be executed by the booster driving device BD, the electromagnetic valves PC1 through PC8, and the electric motor M, which all are electrically controlled by the ECU. Performance of the steering control in accordance with the program illustrated by the flow chart of FIG. 4 is executed at 6 ms calculating cycle when an ignition switch (not shown) is turned on.

Figure 4:
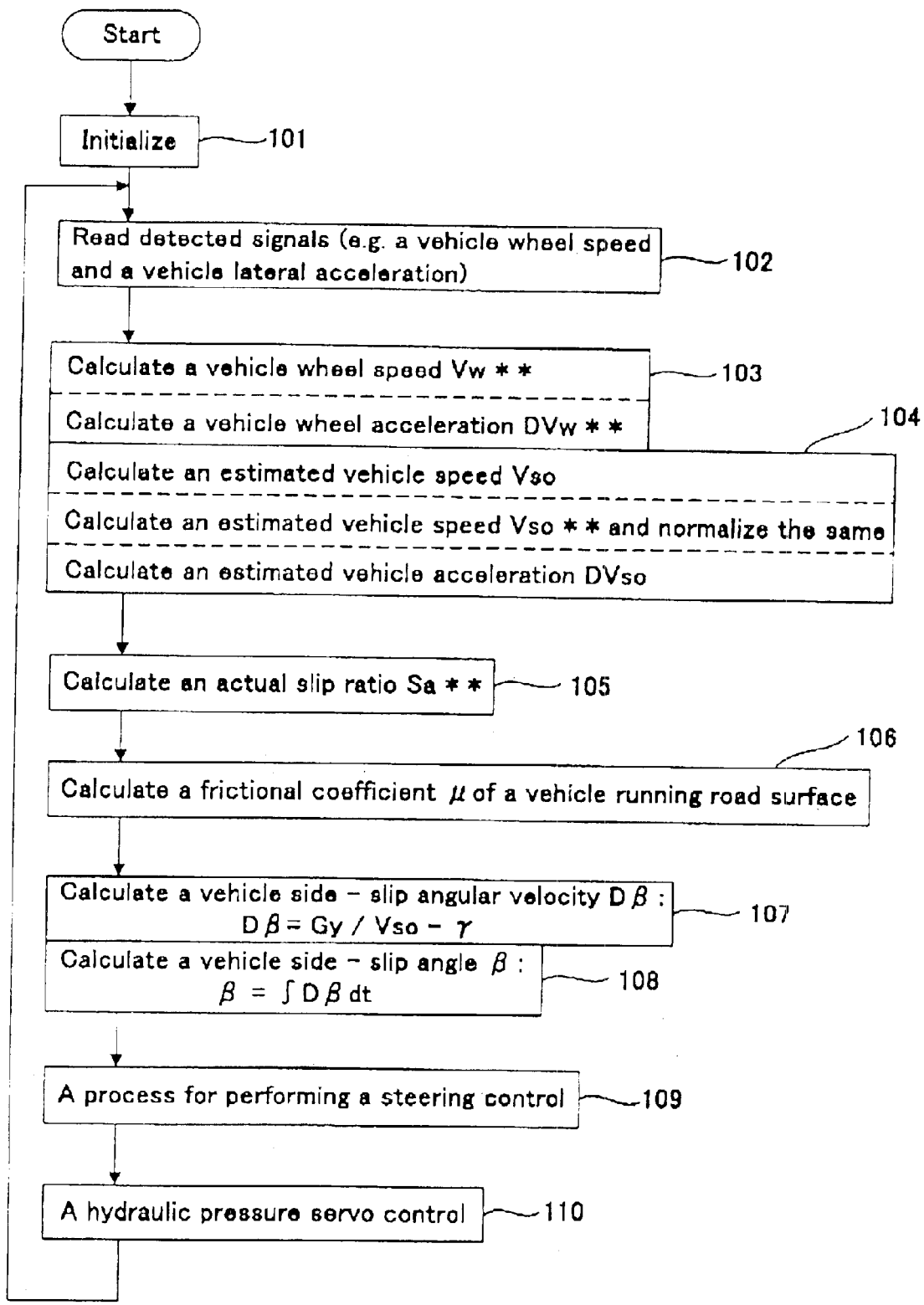
FIG. 4 shows a flow chart explaining a process of a steering control according to the embodiment of the present invention.

Referring to FIG. 4, the program commences at step 101 by initializing the microcomputer for clearing various operational values. At step 102, the microcomputer CMP reads in various signals detected by sensors including signals detected by the wheel speed sensors WS1 through WS4, a signal (the steering angle $\theta f$) detected by the front wheel steering angle sensor SSf, a signal (the actual yaw rate $\gamma$) detected by the yaw rate sensor YS, a signal (the actual lateral acceleration Gya) detected by the lateral acceleration sensor YG, a signal (the stroke of the brake pedal BP) detected by the stroke sensor BS.

The program then proceeds to step 103 for calculating a vehicle wheel speed Vw for each vehicle wheel and for calculating a vehicle wheel acceleration DVw for each vehicle wheel. The vehicle wheel acceleration DVw can be obtained by differentiating the vehicle wheel speed Vw. A formal vehicle wheel acceleration FDVw can be obtained by eliminating a noise generated by the vehicle wheel acceleration DVw through a filter (not shown). At step 104 (a vehicle deceleration detecting means), an estimated vehicle speed Vso (hereinafter, referred to as a first estimated vehicle speed Vso) is calculated at a vehicle center of gravity based upon the vehicle wheel speed Vw** for each wheel. More specifically, when the vehicle has been accelerated or when the vehicle has been running at a constant speed, the first estimated vehicle speed Vso is calculated in accordance with the following equation:

$$Vso=MIN(Vw^{**}).$$

On the other hand, when the brake pedal BP has been operated, the first estimated vehicle speed Vso is calculated in accordance with the following equation:

$$Vso=MAX(Vw^{**}).$$

Next, the program proceeds to calculate an estimated vehicle speed Vso at a position for each wheel FR, FL, RR, and RL Hereinafter, the estimated vehicle speed Vso at the position for each wheel can be referred to as a second estimated vehicle speed Vso. If necessary, the second estimated vehicle speed Vso is normalized for reducing an error caused by a difference between the two wheels located on the inside and outside of the curve while the vehicle is turning. That is, a normalized vehicle speed NVso** is calculated in accordance with the following equation:

$$NVso^{} = Vso^{}(n) - \Delta Vr^{**}(n).$$

$\Delta Vr^{}(n)$ is designated as a correction factor for correcting the error when the vehicle is turning. The designation  represents each wheel FR, FL, RR, and RL, while FW for the designation  represents the front wheels and RW for the designation  represents the rear wheels. The correction factor $\Delta Vr^{**}(n)$ can be determined with reference to a vehicle turning radius R for each wheel and $\gamma \cdot VsoFW$ in accordance with a map (not shown) for each vehicle wheel excluding a reference wheel. The value of $\gamma \cdot VsoFW$ is substantially equal to the lateral acceleration Gya. For example, when the front wheel FL is set as the reference wheel, the correction factor $\Delta VrFL$ is determined to be zero, the correction factor $\Delta VrFR$ is determined in accordance with a map representing the difference of the two wheels located at the inside and the outside of the curve while the vehicle is turning, the correction factor $\Delta VrRL$ is determined in accordance with a map representing the difference of the two wheel located at the front-inside and the rear-outside of the curve while the vehicle is turning, and the correction factor $\Delta VrRR$ is determined in accordance with the map representing the difference of the two wheels located at the inside and the outside of the curve while the vehicle is turning and a map representing the difference of the two wheels located at the front-outside and the rear-outside of the curve while the vehicle is turning. Furthermore, an estimated vehicle longitudinal acceleration Dvso at the vehicle center of gravity (hereinafter, referred to as an estimated vehicle acceleration Dvso) is calculated by differentiating the first estimated vehicle speed Vso.

The program further proceeds to step 105 for calculating an actual slip ratio Sa for each vehicle wheel based upon the vehicle wheel speed Vw for each vehicle wheel calculated at step 103 and the second estimated vehicle speed Vso** for each vehicle wheel calculated at step 104 in accordance with the following equation:

$$Sa^{} = (Vso^{} - Vw^{})/Vso^{}.$$

At step 106, a coefficient $\mu$ representing a friction of a vehicle running road surface is approximately calculated based upon the estimated vehicle acceleration DVso and the actual lateral acceleration Gya of the signal detected by the lateral acceleration sensor YG in accordance with the following equation:

$$\mu = (DVso^2 + Gya^2)^{1/2}.$$

Additionally, a coefficient $\mu^{}$ representing a friction of a vehicle running road surface detected at a position of each vehicle wheel can be also calculated based upon the coefficient $\mu$ and an estimated value of the wheel brake cylinder hydraulic pressure Pw for each vehicle wheel. The program then proceeds to step 107 for calculating a vehicle side-slip angular velocity D$\beta$ based upon the actual yaw rate $\gamma$ detected by the yaw rate sensor YS, the actual lateral acceleration Gya detected by the lateral acceleration sensor YG, and the first estimated vehicle speed Vso in accordance with the following equation:

$$D\beta = Gya/Vso - \gamma.$$

At step 108, a vehicle side-slip angle $\beta$ is calculated in accordance with the following equation:

$$\beta = \int D\beta dt.$$

The vehicle side-slip angle $\beta$ represents an angle of an actual vehicle body direction relative to a vehicle driving direction. The vehicle side-slip angular velocity D$\beta$ corresponds to a value $d\beta/dt$ obtained by differentiating the vehicle side-slip angle $\beta$. Alternatively, the vehicle side-slip angle $\beta$ can be calculated based upon a vehicle speed Vx in the vehicle driving direction and a vehicle speed Vy in a vehicle lateral direction, which intersects with the vehicle driving direction at right angles, in accordance with the following equation:

$$\beta = \tan-1(Vy-Vx).$$

After performing the above-described steps 101 through 108, the program then proceeds to step 109 for executing a process for performing the steering control. Initially, a target slip ratio for the wheel applied with the steering control is determined. The determination of the target slip ratio is described in more detail later. At step 110 as a final step of the present invention, a hydraulic pressure servo control is performed. The hydraulic pressure servo control includes a process for specifying a non-controlled vehicle wheel which is not applied with the steering control, in which a duty is calculated for controlling the opening/closing operation of the electromagnetic valve PC* for the non-controlled vehicle wheel. The brake hydraulic pressure control device BC is then controlled corresponding to the vehicle driving conditions and the program returns to step 102 from step 110. The hydraulic pressure servo control and the non-controlled vehicle wheel specifying process are both described in more details later.

Figure 5:
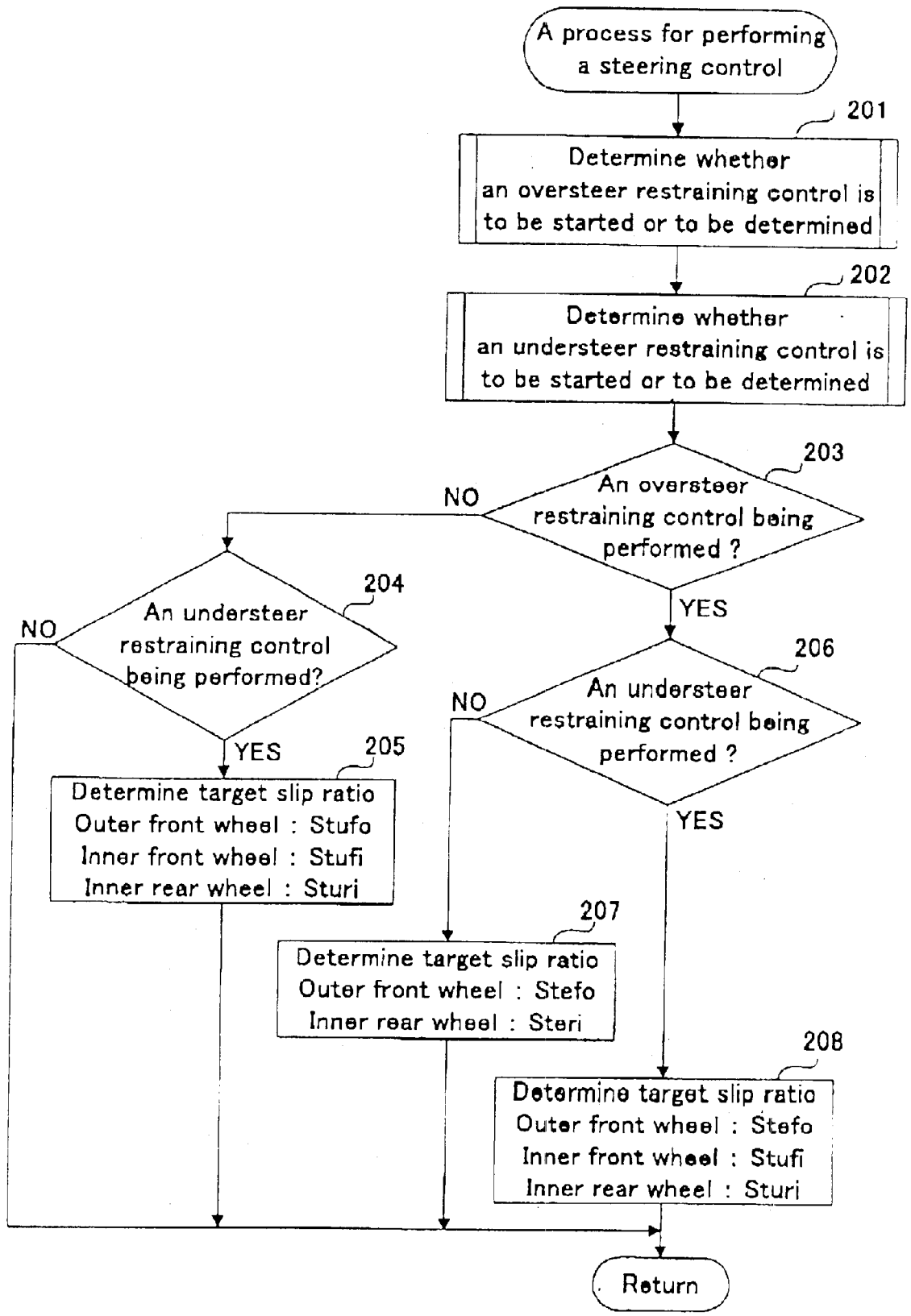
FIG. 5 shows a flow chart explaining details of the process of the steering control explained by the flow chart illustrated in FIG. 4.
Figure 8:
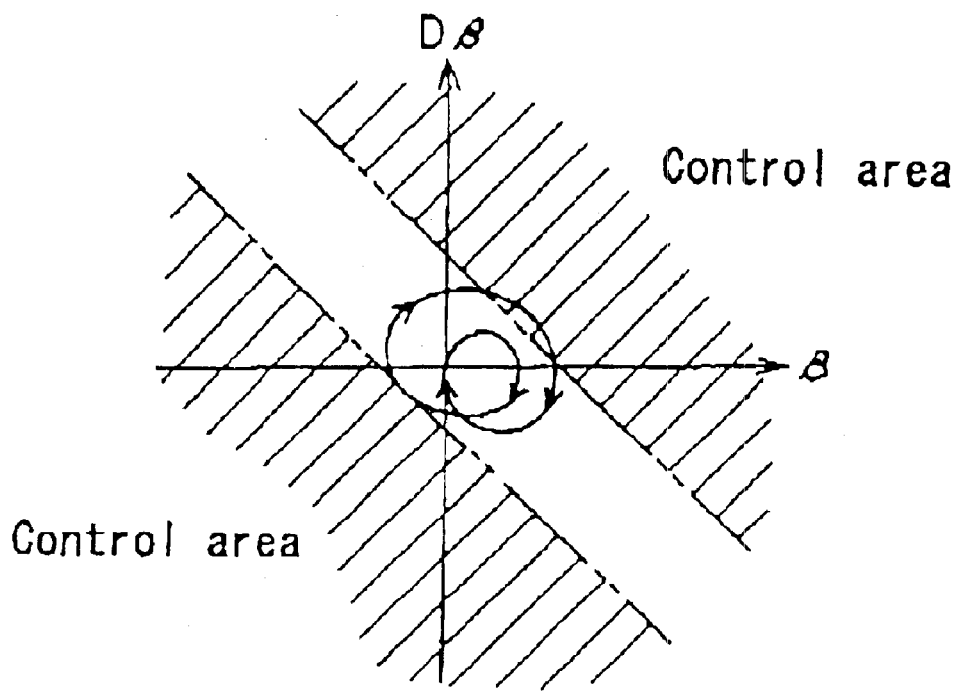
FIG. 8 is a graph showing a control area of an oversteer restraining control according to the embodiment of the present invention.

The process for performing the steering control at step 109 (a hydraulic pressure controlling means) illustrated by the flow chart of FIG. 4 is described hereinbelow with reference to FIG. 5. The steering control includes an oversteer (OS) restraining control and an understeer (US) restraining control. The steering control is performed for determining the target slip ratio for each controlled vehicle wheel in accordance with the OS restraining control/the US restraining control. At step 201, the ECU judges whether or not the OS restraining control is to be started or to be terminated. The performing condition of the OS restraining control is judged with reference to a graph illustrated in FIG. 8. When a value obtained by the vehicle side-slip angle $\beta$ and the vehicle side-slip angular velocity D$\beta$ enters into a control area indicated by hatching in FIG. 8, the OS restraining control is started. On the other hand, when the value deviates from the control area, the OS restraining control is terminated and the vehicle is controlled as illustrated by an arrow of FIG. 8. The braking force of each wheel is increased in response to a further movement of the value from a boundary (as indicated by a double dashed line in FIG. 8) between the control area and a non-control area in a direction of the control area.

Figure 9:
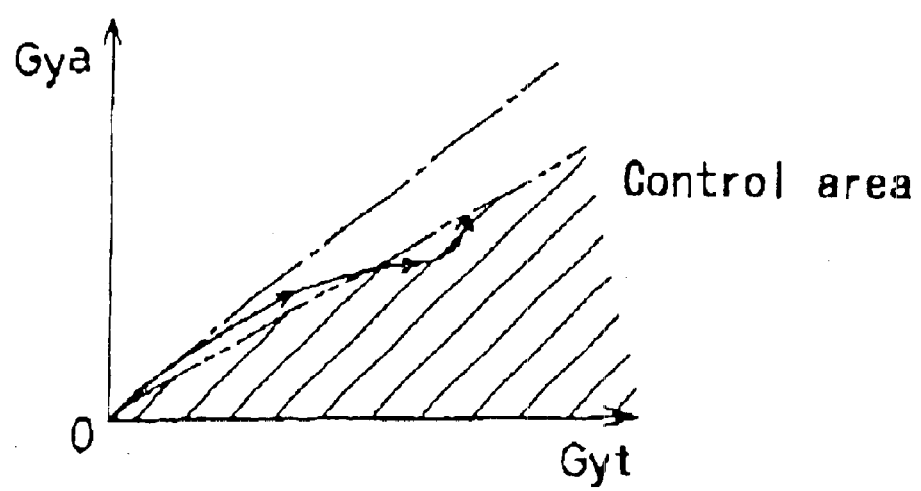
FIG. 9 is a graph showing a control area of an understeer restraining control according to the embodiment of the present invention.

At step 202, the ECU judges whether or not the US restraining control is to be started or to be terminated. The performing condition of the US restraining control is judged with reference to a graph illustrated in FIG. 9. When a value of the actual lateral acceleration Gya relative to a target lateral acceleration Gyt deviates from an ideal condition indicated by a single dashed line and the value enters into a control area, which is indicated by hatching in FIG. 9, the US restraining control is started. On the other hand, when the value deviates from the control area, the US restraining control is terminated. Therefore, the vehicle is controlled as illustrated by an arrow of FIG. 9.

When the OS restraining control is determined not being performed at step 203, the program proceeds to step 204 for determining whether or not the US restraining control is being performed. When the US restraining control is not being performed either, the program returns to a main routine illustrated by the flow chart of FIG. 4. When the US restraining control is determined being performed at step 204, the program proceeds to step 205 for determining a target slip ratio Stufo for a front wheel located at an outside of the curve when the vehicle is turning, a target slip ratio Stufi for a front wheel located at an inside of the curve, and a target slip ratio Sturi for a rear wheel located at an inside of the curve. Hereinafter, a designation "t" of each target slip ratio representing "target" is used for defining a target slip value. The designation "t" is comparable with a designation "a" representing "an actually measured value" which is described later. A designation "u" of each target slip ratio represents "the US restraining control", a designation "f" thereof represents "front wheel", a designation "r" thereof represents "rear wheel", and a designation "o" thereof represents "outside", and a designation "i" thereof represents "inside".

Each target step ratio is determined based upon a difference $\Delta Gy$ between a target lateral acceleration Gyt and the actual lateral acceleration Gya. The target lateral acceleration Gyt is calculated in accordance with the following equation:

$$Gyt = \gamma(\theta f) \cdot Vso.$$

The value $\gamma(\theta f)$ is calculated in accordance with the following equation:

$$\gamma(\theta f) = \{(\theta f/N) \cdot L\} \cdot Vso/(1 + Kh \cdot Vso2).$$

A designation "Kh" represents a stability factor, a designation "N" represents a steering gear ratio, a designation "L" represents a wheel base. The target slip ratio Stufo, Stufi, and Sturi are calculated in accordance with the following equations, respectively:

$$Stufo = K5 \cdot \Delta Gy,$$

$$Stufi = K6 \cdot \Delta Gy,$$

and $$Sturi = K7 \cdot \Delta Gy.$$

A value K5 is a constant for use in the target slip ratio Stufo for the front wheel located at the outside of the curve which should be increasing applied with a braking force or decreasingly applied with a braking force, a value K6 is a constant for use in the target slip ratio Stufi for the front wheel located at the inside of the curve which should be increasingly applied with a braking force, and a value K7 is a constant for use in the target slip ratio Sturi for the rear wheel located at the inside of the curve which should be increasingly applied with a braking force.

On the other hand, when the vehicle is determined to be under the OS restraining control at step 203, the program proceeds to step 206 for determining whether or not the US restraining control has been performed. When the US restraining control has not been performed, the program proceeds to step 207 for determining a target slip ratio Stefo for the front wheel located at the outside of the curve when the vehicle is turning and a target slip ratio Steri for the rear wheel located at the inside of the curve when the vehicle is turning. A designation "e" represents the OS restraining control.

Each target slip ratio Stefo and Steri is calculated based upon the vehicle side-slip angle $\beta$ and the vehicle side-slip angular velocity $D\beta$ in accordance with the following equation:

$$Stefo = K1 \cdot \beta + K2 \cdot D\beta,$$

and $$Steri = K3 \cdot \beta + K4 \cdot D\beta.$$

Each value K1 and K2 is a constant for use in the target slip ratio Stefo for the front wheel located at the outside of the curve which should be increasing applied with a braking force. Each value K3 and K4 is a constant for use in the target slip ratio Steri for the rear wheel located at the inside of the curve which should be decreasingly applied with a braking force. Therefore, the slip ratio Steri is set to be zero when the brake pedal BP has not being depressed. The relationship of the constants K1 through K4 is expressed as follow:

$$K3 \leq K1/5 \text{ and } K4 \leq K2/5.$$

When the US restraining control is determined being performed at step 206, the program proceeds to step 208 for determining a target slip ratio Stefo, the target sip ratio Stufi and the target slip ratio Sturi. That is, when the OS restraining control and the US restraining control are both performed at one time, the target slip ratio for the front wheel located at the outside of the curve is determined in the same manner as the target slip ratio thereof under the OS restraining control, and the target slip ratios for the front and rear wheels located at the inside of the curve is determined in the same manner as the target slip ratio thereof under the US restraining control.

In any case of the above described steering control, a rear wheel located at the outside of the curve when the vehicle is turning is set as a non-controlled wheel of the steering control for calculating the first estimated vehicle speed Vso.

Next, a process for performing the hydraulic pressure servo control performed at the final step 110 in FIG. 4 is described hereinbelow with reference to FIG. 7. According to the process for performing the hydraulic pressure servo control, a slip ratio servo control of the wheel brake cylinder hydraulic pressure for the controlled vehicle wheel is performed. Further a servo control of the wheel brake cylinder hydraulic pressure for the non-controlled vehicle wheel is performed in accordance with the non-controlled vehicle wheel specifying process, in which the duty is calculated for controlling the opening/closing operation of the electromagnetic valve PC* for the non-controlled vehicle wheel.

Initially, the target slip ratios St of the vehicle wheel applied with the brake steering control determined at steps 205, 207, and 208 are received by the ECU at step 401. At step 402, a slip ratio deviation $\Delta St^{}$ between the target slip ratio St and the actual slip ratio Sa for each controlled vehicle wheel is calculated. At step 403, an estimated vehicle acceleration deviation $\Delta DVso^{}$ is calculated. More specifically, at step 402, the slip ratio deviation $\Delta St^{}$ for each controlled vehicle wheel is calculated based upon the target slip ratio St and the actual slip ratio Sa for each controlled vehicle wheel in accordance with the following equation:

$$\Delta St^{} = St^{} - Sa^{**}.$$

At step 403, the estimated vehicle acceleration deviation $\Delta DVso^{}$ for each controlled vehicle wheel is obtained by calculating a difference between the estimated vehicle acceleration DVso and the vehicle wheel acceleration DVw for each controlled vehicle wheel.

At step 404, a parameter Y** for use in the brake hydraulic pressure control is calculated in accordance with the following equation:

$$Y^{}=Gs^{}\cdot \Delta St^{**} (Gs: \text{constant value}).$$

At step 405, a parameter X** for use in the brake hydraulic pressure control is calculated in accordance with the following equation:

$$X^{}=Gd^{}\cdot \Delta DV_{so}^{**} (Gd: \text{constant value}).$$

Figure 10:
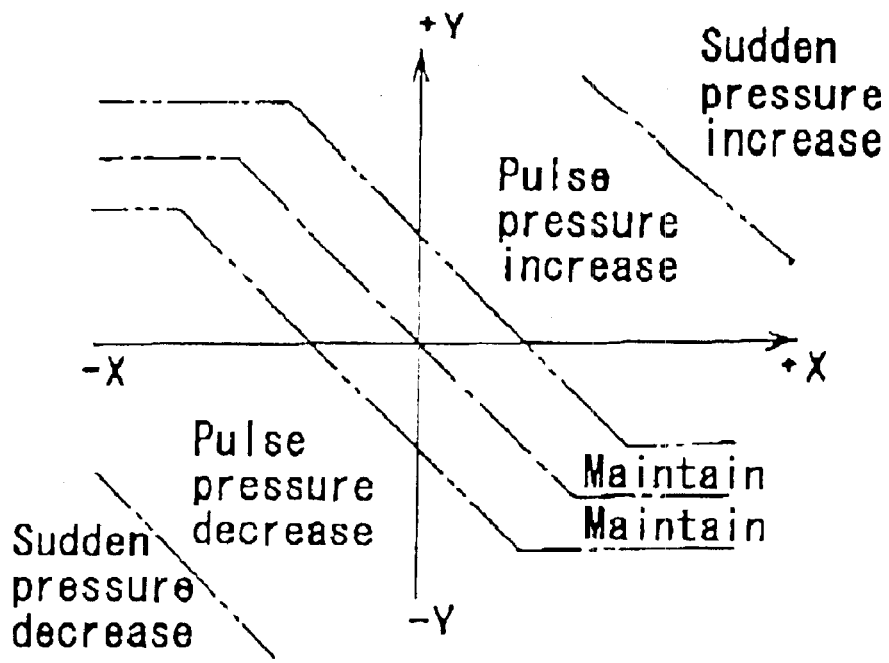
FIG. 10 is a graph showing a relationship between a parameter for use in a brake hydraulic pressure control and a hydraulic pressure mode according to the embodiment of the present invention.

At step 406, a hydraulic pressure mode for each controlled vehicle wheel is determined based upon the parameters X and Y in accordance with a hydraulic pressure control map illustrated in a graph of FIG. 10. As illustrated in FIG. 10, the map is predetermined to have a sudden pressure decreasing range, a pulse pressure decreasing range, a pressure maintaining range, a pulse pressure increasing range, and a sudden pressure increasing range. Therefore, the appropriate one of the ranges is selected in accordance with the parameters X and Y. That is, the hydraulic pressure mode is determined only for the controlled vehicle wheel. When a pulse pressure increasing mode or a pulse pressure decreasing mode is selected, a duty for driving each hydraulic pressure control valve is determined. The duty represents a time for carrying out pressure increasing or a time for carrying out pressure decreasing within a cycle. According to the pulse pressure increasing mode, the duty is set to be increased in a direction of the sudden pressure increasing range in FIG. 10. According to the pulse pressure decreasing mode, the duty is set to be increased in a direction of the sudden pressure decreasing range in FIG. 10.

The hydraulic pressure control mode is not determined when the steering control is not performed. In this case, all the electromagnetic valves PC1 through PC8 are turned off.

Figure 6:
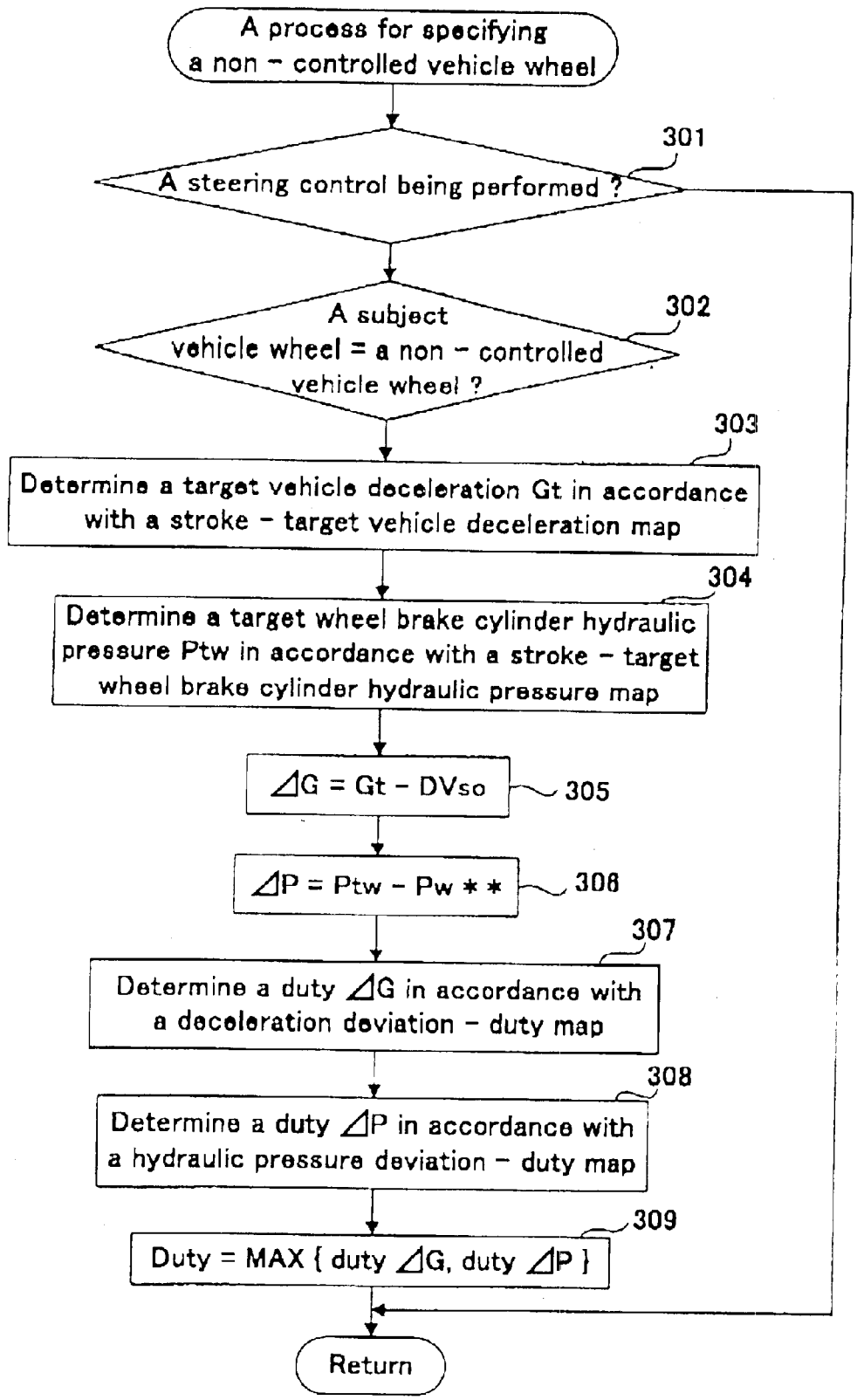
FIG. 6 shows a flow chart explaining details of a process for specifying a non-controlled vehicle wheel illustrated in FIG. 7.

At step 407 (a non-controlled vehicle wheel controlling means), the non-controlled vehicle wheel specifying process is performed. The non-controlled vehicle wheel specifying process is described in more detail with reference to a sub-routine illustrated by a flow chart of FIG. 6.

Figure 11:
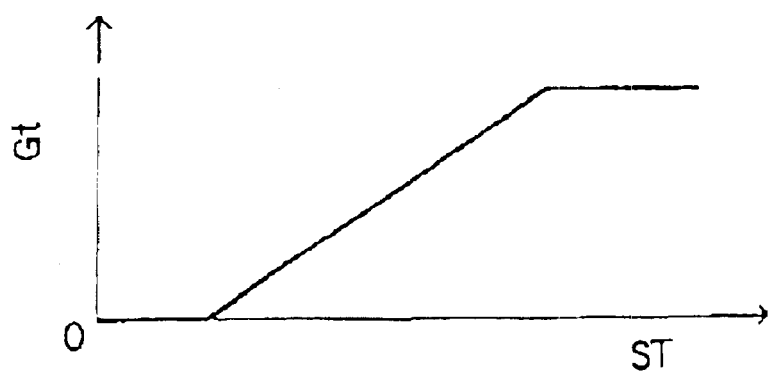
FIG. 11 is a graph showing a stroke—target deceleration map according to the embodiment of the present invention.
Figure 12:
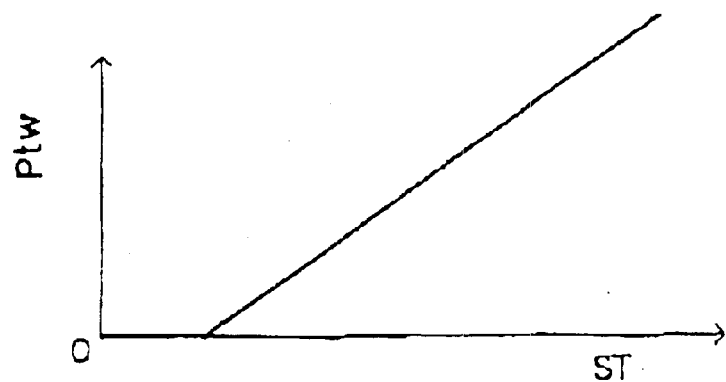
FIG. 12 is a graph showing a stroke—target wheel brake cylinder hydraulic pressure map according to the embodiment of the present invention.

Initially, the ECU determines whether or not the steering control has been performed at step 301. More particularly, the ECU determines whether or not at least one of the OS restraining control and the US restraining control has been performed at step 301. When the steering control has been performed, the program proceeds to step 302 for determining whether or not a subject vehicle wheel is the non-controlled vehicle wheel. When the subject vehicle wheel is the non-controlled vehicle wheel, the program proceeds to step 303 (a target vehicle deceleration calculating means) for calculating a target vehicle deceleration Gt based upon the stroke St of the brake pedal BP. More specifically, the target vehicle deceleration Gt is determined corresponding to the stroke St of the brake pedal BP in accordance with a stroke-target vehicle deceleration map illustrated in a graph of FIG. 11. At step 304 (a target wheel brake cylinder hydraulic pressure calculating means), a target wheel brake cylinder hydraulic pressure Ptw is calculated based upon the stroke St of the brake pedal BP detected by the stroke sensor BS in accordance with a stroke-target wheel brake cylinder hydraulic pressure map illustrated by a graph of FIG. 12.

The program then proceeds to step 305 (a deceleration deviation calculating means) for calculating a vehicle deceleration deviation ΔG based upon the target vehicle deceleration Gt calculated at step 303 and the estimated vehicle acceleration DVso calculated at step 104 in accordance with the following equation:

$$\Delta G=Gt-|DVso|.$$

At step 306 (a hydraulic pressure deviation calculating means), a hydraulic pressure deviation ΔP is calculated based upon the target wheel brake cylinder hydraulic pressure Ptw calculated at step 304 and the wheel brake cylinder hydraulic pressure Pw detected by the pressure sensor PS in accordance with the following equation:

$$\Delta P=Ptw-Pw^{**}.$$

Figure 13:
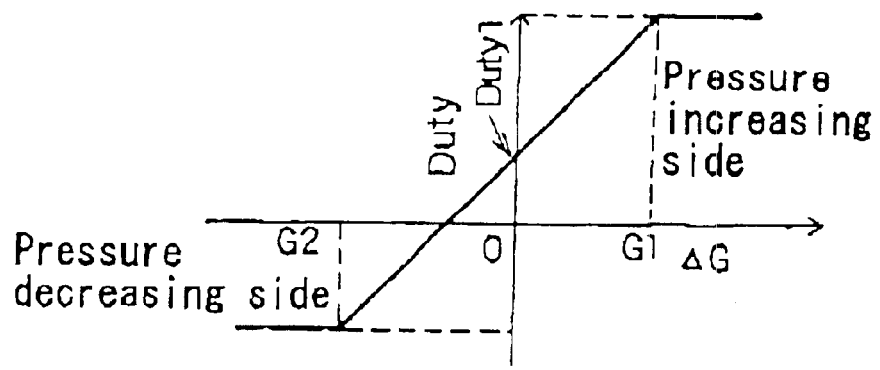
FIG. 13 is a graph showing a deceleration deviation—duty map according to the embodiment of the present invention.

The program then proceeds to step 307 for calculating a duty ΔG for use in the pulse pressure increasing control or the pulse pressure decreasing control of the electromagnetic valve PC* for the non-controlled vehicle wheel based upon the deceleration deviation ΔG in accordance with a deceleration deviation—duty map illustrated by a graph of FIG. 13. When the duty ΔG is a positive (+) value, the pulse pressure increasing control is executed. When the duty ΔG is a negative (−) value, the pulse pressure decreasing control is executed.

According to the deceleration deviation—duty map of FIG. 13, when the deceleration deviation ΔG is set in accordance with the following equation:

$$G2 \leq \Delta G \leq G1 (G1: \text{a positive (+)predetermined value}, G2: \text{a negative (−) predetermined value}),$$

The duty ΔG is set to be linearly increased corresponding to the increase of the deceleration deviation ΔG. When the deceleration deviation ΔG is set in accordance with the following equation:

$$G1 \leq \Delta G,$$

the duty ΔG is set at a positive (+) threshold value. When the deceleration deviation ΔG is set in accordance with the following equation:

$$\Delta G \leq G2,$$

the duty ΔG is set at a negative (−) threshold value. When the deceleration deviation ΔG is set at zero, the duty ΔG is set at a positive (+) predetermined value Duty 1. As described above, the pulse pressure increasing control can be performed.

Figure 14:
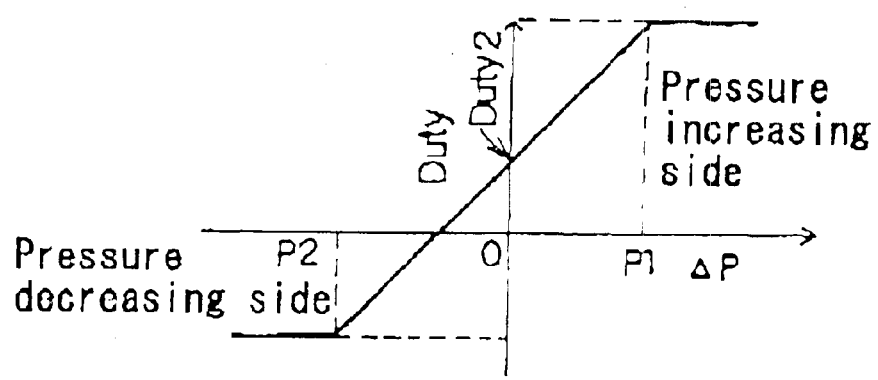
FIG. 14 is a graph showing a hydraulic pressure deviation—duty map according to the embodiment of the present invention.

At step 308, a duty ΔP for use in the pulse pressure increasing control or the pulse pressure decreasing control of the electromagnetic valve PC* for the non-controlled vehicle wheel based upon a hydraulic pressure deviation ΔP in accordance with a hydraulic pressure deviation—duty map illustrated by a graph of FIG. 14. When the duty ΔP is a positive (+) value, the pulse pressure increasing control is executed. When the duty ΔP is a negative (−) value, the pulse pressure decreasing control is executed. According to the hydraulic pressure deviation—duty map of FIG. 13, when the hydraulic pressure deviation ΔP is set in accordance with the following equation:

$$P2 \leq \Delta P \leq P1 (P1: \text{a positive (+) predetermined value}, P2: \text{a negative (−) predetermined value}),$$

the duty ΔP is set to be linearly increased corresponding to the increase of the hydraulic pressure deviation ΔP. When the hydraulic pressure deviation ΔP is set in accordance with the following equation:

$$P1 \leq \Delta P,$$

the duty $\Delta P$ is set at a positive (+) threshold value. When the hydraulic pressure deviation $\Delta P$ is set in accordance with the following equation:

$$\Delta P \leq P2,$$

the duty $\Delta P$ is set at a negative (−) threshold value. When the hydraulic pressure deviation $\Delta P$ is set at zero, the duty $\Delta P$ is set at a positive (+) predetermined value Duty 2. As described above, the pulse pressure increasing control can be performed.

The program then proceeds to step 309 (a valve controlling means) as a final step of the non-controlled vehicle wheel specifying process. At step 309, a larger value of either the duty $\Delta G$ or the duty $\Delta P$ is selected as the duty for use in the pulse pressure increasing control or the pulse pressure decreasing control of the electromagnetic valve PC** for the non-controlled vehicle wheel.

Figure 7:
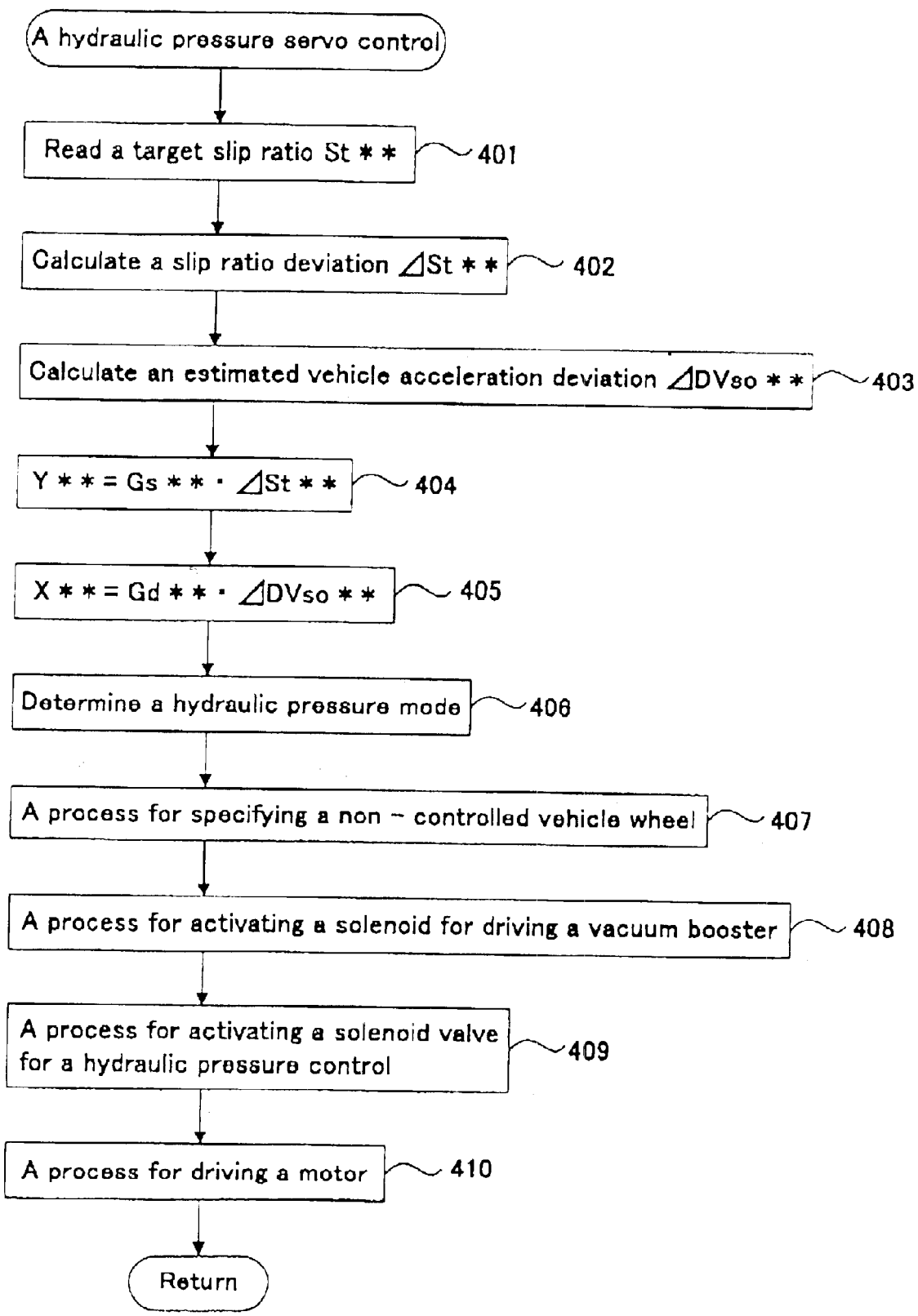
FIG. 7 shows a flow chart explaining details of a hydraulic pressure servo control illustrated in FIG. 4.

When the steering control is determined not being performed at step 301 or when the subject wheel is not the non-controlled vehicle wheel at step 302, the program returns to the hydraulic pressure servo control process illustrated in FIG. 7 without performing the non-controlled vehicle wheel specifying process.

When the non-controlled vehicle wheel specifying process is terminated, the program returns to the hydraulic pressure servo control process illustrated in FIG. 7 and proceeds to step 408 for activating the solenoid D1 for driving the vacuum booster VB. The program further proceeds to step 409 for controlling the opening/closing operation of the electromagnetic valve PC* based upon the hydraulic pressure mode and the duty for the controlled vehicle wheel set at step 406 and the duty for the non-controlled vehicle wheel set at step 309. Therefore, the brake hydraulic pressure of the wheel brake cylinder for the controlled vehicle wheel is applied with any one of the sudden pressure increasing control, the pulse pressure increasing control, the pressure maintaining control, the pulse pressure decreasing control, or the sudden pressure decreasing control. At the same time, the brake hydraulic pressure of the wheel brake cylinder for the non-controlled vehicle wheel is applied with any one of the pulse pressure increasing control, the pressure maintaining control, and the pulse pressure decreasing control. The program proceeds to step 410 for driving the motor M. The motor M is fully driven while the steering control has been performed.

As described above, according to the embodiment of the present invention, the hydraulic pressure control valve of the non-controlled vehicle wheel is controlled, i.e. the hydraulic pressure control valve of the non-controlled vehicle wheel is applied with the pulse pressure increasing control or the pulse pressure decreasing control based upon a deviation, which has a larger duty, of either the deceleration deviation $\Delta G$ or the hydraulic pressure deviation $\Delta P$. Therefore, when the brake pedal BP is operated by the driver while the steering control has been executed, the brake hydraulic pressure in the wheel brake cylinder for the non-controlled vehicle wheel can be adjusted to substantially correspond to the stroke of the brake pedal BP. Therefore, the vehicle can be decelerated in response to a driver's requirement. In this case, a brake operating feeling transmitted to the driver can be improved.

That is, the brake hydraulic pressure in the wheel brake cylinder for the non-controlled vehicle wheel is adjusted so as to approximate a physical quantity relevant to the deviation, which has a larger duty, of either the deceleration deviation $\Delta G$ or the hydraulic pressure deviation $\Delta P$, to a target value with reference to the brake pedal operational amount. Therefore, the vehicle deceleration corresponding to the brake pedal operational amount can be generated. According to the embodiment of the present invention, the physical quantity of the deviation which has a lager deviated amount between a target value and an actual value is employed as a subject to be controlled. When the deviation is larger, the hydraulic pressure control valve device can be controlled in response to a larger control command amount so as to reduce the deviation. Therefore, the deviation can be expected to be reduced earlier. Further, the driver is expected to be applied with an appropriate brake feeling when the brake hydraulic pressure in the wheel brake cylinder for the non-controlled vehicle wheel is adjusted corresponding to the above described reduction of the deviation.

More specifically, taking the oversteer restraining control as an example, when the oversteer restraining control is performed when the brake pedal is not being depressed, the front wheel at the outside of the curve and the rear wheel at the inside of the curve are set as the controlled vehicle wheel and the front wheel at the inside of the curve and the rear wheel at the outside of the curve are set as the non-controlled vehicle wheel. When the braking force for the front wheel at the outside of the curve is increased, the braking force of the rear wheel at the inside of the curve is set to be zero. When the brake pedal is depressed while the oversteer restraining control has been performed, the braking force for the front wheel at the inside of the curve and the rear wheel at the outside of the curve are increased corresponding to the stroke of the brake pedal. In this case, the braking force for the rear wheel at the inside of the curve is maintained to be zero. The braking force for the front wheel at the outside of the curve is represented by Bffo, the braking force of the front wheel at the inside of the curve after operating the brake pedal is represented by Bffi, and the braking force of the rear wheel at the outside of the curve is represented by Bfro. In this case, a sum of a braking force deviation $\Delta$Bfp between the right and left vehicle wheels before the operation of the brake pedal is set to be Bffo and a sum of a braking force deviation $\Delta$Bfa between the right and left vehicle wheels after the operation of the brake pedal is set in accordance with the following equation:

$$\Delta Bfa = (Bffo + Bfro) - Bffi.$$

The braking force Bfro is approximately equal to the braking force Bffi. Therefore, the sum of the braking force deviation $\Delta$Bfa between the right and left vehicle wheels after the operation of the brake pedal substantially becomes equal to the braking force Bffo. Therefore, outward yawing moment (oversteer restraining control moment) which are generated both before the brake pedal operation and after that, can be substantially the same. That is, the oversteer restraining control can be effectively performed after the brake pedal operation as well as before the brake pedal operation.

As aforementioned, according to the embodiment of the present invention, when the brake pedal is operated while the oversteer restraining control has been performed, the outward yawing moment is maintained and the hydraulic pressure control valve for the non-controlled vehicle wheel can be controlled in response to the stroke of the brake pedal.

Further, according to the embodiment of the present invention, when a deviation, which has a larger deviated amount, of either the deceleration deviation $\Delta G$ or the hydraulic pressure deviation $\Delta P$ corresponds to zero, the duty for controlling the hydraulic pressure control valve for the non-controlled vehicle wheel is set at a positive (+) predetermined value (Duty 1 or Duty 2) as illustrated by the graph of FIG. 13 or FIG. 14. The hydraulic pressure control valve for the non-controlled vehicle wheel can be hence applied with the pulse pressure increasing control. Therefore, the wheel brake cylinders for all the vehicle wheels can be effectively prevented from being disconnected from the master cylinder while the steering control has been executed. This can lead to assuring the stroke of the brake pedal when the brake pedal is operated while the steering control has been executed. On the other hand, if the brake hydraulic pressure in the wheel brake cylinder for the non-controlled vehicle wheel when the deviation which has the larger deviated amount corresponds to zero, the wheel brake cylinders for all vehicle wheels may be disconnected from the master cylinder. Even if the brake pedal BP is depressed by the driver under the condition, a desired pedal stroke can not be assured.

According to the embodiment of the present invention, the hydraulic pressure generating device is formed with the vacuum booster VB, the booster driving device BD, and the master cylinder MC. However, the hydraulic pressure generating device can be formed in the other structure. The hydraulic pressure generating device can be formed by a hydraulic pressure pump, the master cylinder, and an electromagnetic valve mechanism. The electromagnetic valve mechanism interrupts communication between an inlet side of the hydraulic pressure pump and the master cylinder when the braking operation is not performed. On the other hand, the electromagnetic valve mechanism establishes the communication between the inlet side of the hydraulic pressure pump and the master cylinder and interrupts communication between an outlet side of the hydraulic pressure pump and the master cylinder when the hydraulic pressure has been supplied to the controlled vehicle wheel, e.g. when the steering control has been performed. In this case, the brake fluid from the master cylinder is drawn in and pressurized by the hydraulic pressure pump and is supplied to the wheel brake cylinder via the hydraulic pressure control valve. Alternatively, the hydraulic pressure generating device can be formed by an accumulator for accumulating a highly pressurized brake fluid.

The brake control device according to the embodiment of the present invention is described for use in the steering control. However, the brake control device of the present invention is applicable for use in a traction control and a rolling over control (a vehicle rolling preventing control).

According to the embodiment of the present invention, the stroke sensor BS is employed as a brake amount detecting means. However, other sensors including a brake pedal depression sensor for detecting a depressing of the brake pedal BP can be employed as the brake amount detecting means.

According to the present invention, the hydraulic pressure control valve for the non-controlled vehicle wheel is controlled for controlling the brake hydraulic pressure in the wheel brake cylinder for the non-controlled vehicle wheel substantially corresponding to the operational amount of the brake pedal when the brake pedal is operated while the hydraulic pressure has been supplied to the controlled vehicle wheel. Therefore, the vehicle deceleration corresponding to the operational amount of the brake pedal can be generated when the brake pedal is operated while the hydraulic pressure has been supplied to the controlled vehicle wheel. This can lead to improving the brake operating feeling applied to the driver.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A brake control device for a vehicle comprising:
   a first wheel brake cylinder equipped to a first vehicle wheel for applying a braking force to the first vehicle wheel;
   a second wheel brake cylinder equipped to a second vehicle wheel for applying a braking force to the second vehicle wheel;
   a hydraulic pressure generating device for generating a hydraulic pressure irrespectively of operation of a brake operating member;
   a hydraulic pressure control valve device disposed between the hydraulic pressure generating device and the first and second wheel brake cylinders for controlling the brake hydraulic pressure in the respective first and second wheel brake cylinders;
   a hydraulic pressure controlling means for controlling the hydraulic pressure control valve device for one of the first and second wheel brake cylinders equipped to one of the first and second vehicle wheels to be controlled in response to a vehicle driving condition for supplying the hydraulic pressure from the hydraulic pressure generating device to the one wheel brake cylinder for the one vehicle wheel to be controlled at least when the brake operating member is not being operated;
   a brake amount detecting means for detecting an operational amount of the brake operating member;
   a vehicle deceleration detecting means for detecting or estimating a vehicle deceleration;
   a wheel brake cylinder hydraulic pressure detecting means for detecting or estimating the brake hydraulic pressure in the respective first and second wheel brake cylinders;
   a non-controlled vehicle wheel controlling means for controlling the hydraulic pressure control valve device for the other one of the first and second vehicle wheels which is not controlled by the hydraulic pressure controlling means so as to control the brake hydraulic pressure in the other wheel brake cylinder equipped to the other vehicle wheel which is not controlled by the hydraulic pressure controlling means in response to the operational amount of the brake operating member when the brake operating member is operated while the hydraulic pressure has been supplied to the one wheel brake cylinder by the hydraulic pressure controlling means, the non-controlled vehicle wheel controlling means including:
      a target vehicle deceleration calculating means for calculating a target vehicle deceleration based upon the brake operating member operational amount detected by the brake amount detecting means;
      a target wheel brake cylinder hydraulic pressure calculating means for calculating a target wheel brake cylinder hydraulic pressure for the other wheel brake cylinder based upon the brake operating member operational amount detected by the brake amount detecting means;

a deceleration deviation calculating means for calculating a deceleration deviation between the target vehicle deceleration calculated by the target vehicle deceleration calculating means and the vehicle deceleration detected or estimated by the vehicle deceleration detecting means;

a hydraulic pressure deviation calculating means for calculating a hydraulic pressure deviation between the target wheel brake cylinder hydraulic pressure for the other wheel brake cylinder calculated by the target wheel brake cylinder hydraulic pressure calculating means and the brake hydraulic pressure in the other wheel brake cylinder detected or estimated by the wheel brake cylinder hydraulic pressure detecting means; and a valve controlling means for controlling the hydraulic pressure control valve device for the other vehicle wheel which is not controlled by the hydraulic pressure controlling means so as to decrease a larger deviation in response to a deviated amount of the larger deviation of either the deceleration deviation calculated by the deceleration deviation calculating means or the hydraulic pressure deviation calculated by the hydraulic pressure deviation calculating means.

2. A brake control device for a vehicle according to claim 1, wherein the valve controlling means controls the hydraulic pressure control device so as to apply a pulse pressure increase to the brake hydraulic pressure in the other wheel brake cylinder equipped to the other vehicle wheel which is not controlled by the hydraulic pressure controlling means when the larger deviation corresponds to zero.

3. A brake control device for a vehicle according to claim 1, further comprising:

the hydraulic pressure generating device including:
a master cylinder hydraulically connected to the respective first and second wheel brake cylinders for supplying a master cylinder hydraulic pressure to the respective first and second wheel brake cylinders;
a vacuum booster connected to the brake operating member for boosting the master cylinder;
a booster driving means for automatically driving the vacuum booster when the brake operating member is not being operated so that the master cylinder hydraulic pressure is generated by the master cylinder; and
a brake operating member holding mechanism for holding the brake operating member at an initial position when the vacuum booster has been automatically driven by the booster driving means;

the hydraulic pressure controlling means for controlling the booster driving means and the hydraulic pressure control valve device for the one vehicle wheel to be controlled in response to the vehicle driving condition; and the brake amount detecting means including a stroke sensor for detecting a stroke of the brake operating member.

4. A brake control device for a vehicle according to claim 2, further comprising:

the hydraulic pressure generating device including:
a master cylinder hydraulically connected to the respective first and second wheel brake cylinders for supplying a master cylinder hydraulic pressure to the respective first and second wheel brake cylinders;
a vacuum booster connected to the brake operating member for boosting the master cylinder;
a booster driving means for automatically driving the vacuum booster when the brake operating member is not being operated so that the master cylinder hydraulic pressure is generated by the master cylinder; and
a brake operating member holding mechanism for holding the brake operating member at an initial position when the vacuum booster has been automatically driven by the booster driving means;

the hydraulic pressure controlling means for controlling the booster driving means and the hydraulic pressure control valve device for the one vehicle wheel to be controlled in response to the vehicle driving condition; and the brake amount detecting means including a stroke sensor for detecting a stroke of the brake operating member.

5. A brake control device for a vehicle according to claim 3, further comprising:

the vacuum booster including:
a movable wall;
a constant pressure chamber defined at a front side of the movable wall and introduced with a negative pressure;
a variable pressure chamber defined at a rear side of the movable wall and selectively determined to be either under a condition being connected to the constant pressure chamber and being introduced with the negative pressure or under a condition being disconnected from the constant pressure chamber and being connected to an atmosphere; and
a valve mechanism for establishing/interrupting communication between the constant pressure chamber and the variable pressure chamber and for establishing/interrupting communication between the variable pressure chamber and the atmosphere in response to the operation of the brake operating member;

the booster driving means including:
a solenoid disposed in the vacuum booster for driving the valve mechanism so as to interrupt the communication between the variable pressure chamber and the constant pressure chamber and to establish the communication between the variable pressure chamber and the atmosphere when the brake operating member is not being operated; and the brake operating member holding mechanism including:
a first input member operatively connected to the brake operating member; and
a second input member driving the valve mechanism by being moved in a forward direction integrally with the first input member when the brake operating member is being operated and being movable in the forward direction with the movable wall relative to the first input member when the brake operating member is not being operated.

6. A brake control device for a vehicle according to claim 4, further comprising:

the vacuum booster including:
a movable wall;
a constant pressure chamber defined at a front side of the movable wall and introduced with a negative pressure;

a variable pressure chamber defined at a rear side of the movable wall and selectively determined to be either under a condition being connected to the constant pressure chamber and being introduced with the negative pressure or under a condition being disconnected from the constant pressure chamber and being connected to an atmosphere; and a valve mechanism for establishing/interrupting communication between the constant pressure chamber and the variable pressure chamber and for establishing/interrupting communication between the variable pressure chamber and the atmosphere in response to the operation of the brake operating member;

the booster driving means including:

a solenoid disposed in the vacuum booster for driving the valve mechanism so as to interrupt the communication between the variable pressure chamber and the constant pressure chamber and to establish the communication between the variable pressure chamber and the atmosphere when the brake operating member is not being operated; and the brake operating member holding mechanism including:

a first input member connected to the brake operating member; and a second input member driving the valve mechanism by being moved in a forward direction integrally with the first input member when the brake operating member is being operated and being movable in the forward direction with the movable wall relative to the first input member when the brake operating member is not being operated.

7. A brake control device for a vehicle according to claim 1, wherein the hydraulic pressure controlling means includes at least either a steering control means, in which the hydraulic pressure control valve device is controlled in accordance with either a vehicle oversteered state or a vehicle understeered state so as to apply a braking force to at least either the first vehicle wheel or the second vehicle wheel, or a traction control, in which the hydraulic pressure control valve device is controlled in accordance with an acceleration slip condition of one of the first and second vehicle wheels serving as a vehicle driving wheel so as to apply a braking force to the vehicle driving wheel when the vehicle has been accelerated.

8. A brake control device for a vehicle according to claim 2, wherein the hydraulic pressure controlling means includes at least either a steering control means, in which the hydraulic pressure control valve device is controlled in accordance with either a vehicle oversteered state or a vehicle understeered state so as to apply a braking force to at least either the first vehicle wheel or the second vehicle wheel, or a traction control, in which the hydraulic pressure control valve device is controlled in accordance with an acceleration slip condition of one of the first and second vehicle wheels serving as a vehicle driving wheel so as to apply a braking force to the vehicle driving wheel when the vehicle has been accelerated.

9. A brake control device for a vehicle according to claim 3, wherein the hydraulic pressure controlling means includes at least either a steering control means, in which the hydraulic pressure control valve device is controlled in accordance with either a vehicle oversteered state or a vehicle understeered state so as to apply a braking force to at least either the first vehicle wheel or the second vehicle wheel, or a traction control, in which the hydraulic pressure control valve device is controlled in accordance with an acceleration slip condition of one of the first and second vehicle wheels serving as a vehicle driving wheel so as to apply a braking force to the vehicle driving wheel when the vehicle has been accelerated.

10. A brake control device for a vehicle according to claim 4, wherein the hydraulic pressure controlling means includes at least either a steering control means, in which the hydraulic pressure control valve device is controlled in accordance with either a vehicle oversteered state or a vehicle understeered state so as to apply a braking force to at least either the first vehicle wheel or the second vehicle wheel, or a traction control, in which the hydraulic pressure control valve device is controlled in accordance with an acceleration slip condition of one of the first and second vehicle wheels serving as a vehicle driving wheel so as to apply a braking force to the vehicle driving wheel when the vehicle has been accelerated.

11. A brake control device for a vehicle according to claim 5, wherein the hydraulic pressure controlling means includes at least either a steering control means, in which the hydraulic pressure control valve device is controlled in accordance with either a vehicle oversteered state or a vehicle understeered state so as to apply a braking force to at least either the first vehicle wheel or the second vehicle wheel, or a traction control, in which the hydraulic pressure control valve device is controlled in accordance with an acceleration slip condition of one of the first and second vehicle wheels serving as a vehicle driving wheel so as to apply a braking force to the vehicle driving wheel when the vehicle has been accelerated.

12. A brake control device for a vehicle according to claim 6, wherein the hydraulic pressure controlling means includes at least either a steering control means, in which the hydraulic pressure control valve device is controlled in accordance with either a vehicle oversteered state or a vehicle understeered state so as to apply a braking force to at least either the first vehicle wheel or the second vehicle wheel, or a traction control, in which the hydraulic pressure control valve device is controlled in accordance with an acceleration slip condition of one of the first and second vehicle wheels serving as a vehicle driving wheel so as to apply a braking force to the vehicle driving wheel when the vehicle has been accelerated.

13. A brake control device for a vehicle according to claim 1, wherein the hydraulic pressure control valve device includes a first hydraulic pressure control valve disposed between the hydraulic pressure generating device and the first wheel brake cylinder and a second hydraulic pressure control valve disposed between the hydraulic pressure generating device and the second wheel brake cylinder, the second hydraulic pressure control valve being operable irrespectively of operation of the first pressure control valve.

* * * * *